US010774170B2

(12) United States Patent
Zhao et al.

(10) Patent No.: US 10,774,170 B2
(45) Date of Patent: Sep. 15, 2020

(54) AQUEOUS POLYURETHANE DISPERSIONS

(71) Applicant: Henkel AG & Co. KGaA, Duesseldorf (DE)

(72) Inventors: Ligang Zhao, Duesseldorf (DE); Cristina Berges, Saragossa (ES); Sorin N. Sauca, Timisoara (RO); Francisco Vera Saz, Saragossa (ES); Ece Koc, Tarragona (ES)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/698,009

(22) Filed: Sep. 7, 2017

(65) Prior Publication Data
US 2017/0369624 A1 Dec. 28, 2017

Related U.S. Application Data

(63) Continuation of application No. PCT/EP2016/055281, filed on Mar. 11, 2016.

(30) Foreign Application Priority Data

Mar. 12, 2015 (EP) .................................... 15158809

(51) Int. Cl.
| C08G 18/08 | (2006.01) |
| C08G 18/62 | (2006.01) |
| C08G 18/50 | (2006.01) |
| C08G 18/38 | (2006.01) |
| C08G 18/42 | (2006.01) |
| C08G 18/66 | (2006.01) |
| C08G 18/24 | (2006.01) |
| C08G 18/40 | (2006.01) |
| C08G 18/34 | (2006.01) |
| C08G 18/72 | (2006.01) |
| C08L 23/00 | (2006.01) |
| C08L 93/04 | (2006.01) |
| C09J 175/04 | (2006.01) |
| C09D 175/04 | (2006.01) |
| C08G 18/69 | (2006.01) |
| C08G 18/12 | (2006.01) |
| C08G 18/10 | (2006.01) |
| C08G 18/32 | (2006.01) |

(52) U.S. Cl.
CPC ..... *C08G 18/0866* (2013.01); *C08G 18/0823* (2013.01); *C08G 18/0828* (2013.01); *C08G 18/10* (2013.01); *C08G 18/12* (2013.01); *C08G 18/246* (2013.01); *C08G 18/3271* (2013.01); *C08G 18/348* (2013.01); *C08G 18/3855* (2013.01); *C08G 18/4063* (2013.01); *C08G 18/42* (2013.01); *C08G 18/5015* (2013.01); *C08G 18/6208* (2013.01); *C08G 18/6692* (2013.01); *C08G 18/698* (2013.01); *C08G 18/722* (2013.01); *C08L 23/00* (2013.01); *C08L 93/04* (2013.01); *C09D 175/04* (2013.01); *C09J 175/04* (2013.01); *C08G 2170/80* (2013.01); *C08L 2205/03* (2013.01)

(58) Field of Classification Search
CPC ............ C08G 18/0866; C08G 18/5015; C08G 18/6208; C08G 18/6692; C08G 18/722; C08G 18/0823; C08G 18/0828; C08G 18/246; C08G 18/348; C08G 18/3855; C08G 18/4063; C08G 18/42; C08G 18/10; C08G 18/3271; C08G 2170/80; C08G 18/698; C08G 18/12; C08L 23/00; C08L 93/04; C08L 2205/03; C09J 175/04; C09D 175/04
See application file for complete search history.

(56) References Cited

U.S. PATENT DOCUMENTS

| 4,507,430 A | 3/1985 | Shimada et al. |
| 4,616,061 A * | 10/1986 | Henning ............ C08G 18/0819 427/385.5 |
| 5,234,996 A | 8/1993 | Mori et al. |
| 5,308,914 A | 5/1994 | Walton et al. |
| 5,342,890 A * | 8/1994 | Sirinyan .................. C08J 7/047 525/127 |
| 5,608,000 A | 3/1997 | Duan et al. |
| 5,672,653 A | 9/1997 | Frisch et al. |
| 6,008,286 A | 12/1999 | Groves |
| 6,046,295 A | 4/2000 | Frisch, Jr. et al. |
| 6,593,423 B1 * | 7/2003 | Kondos .................... C08J 7/047 525/191 |

(Continued)

FOREIGN PATENT DOCUMENTS

| CN | 101974141 A | 2/2011 |
| CN | 102977320 A | 3/2013 |

(Continued)

OTHER PUBLICATIONS

International Search Report for International PCT Patent Application No. PCT/EP2016/055281 dated May 20, 2016.
Song, J; Batra, A;Rego, J, Macosko, C. Prog, Org. Coat (2011), 72, 492-497.
ISO 22412.
Ou Yuxiang, Flame Retardant, National Defense Industry Press, p. 137, published Sep. 2009.

(Continued)

*Primary Examiner* — Patrick D Niland
(74) *Attorney, Agent, or Firm* — James E. Piotrowski

(57) ABSTRACT

The present invention relates to processes for the manufacture of aqueous polyurethane dispersions that can be used as adhesives or coatings, are solvent free and have low VOC emissions, and are environmentally friendly. Also encompassed are the dispersions as such, compositions containing them and their use as coatings and adhesives.

18 Claims, No Drawings

(56) References Cited

U.S. PATENT DOCUMENTS

| | | |
|---|---|---|
| 7,160,944 B2 | 1/2007 | Bechara et al. |
| 10,553,872 B2 | 2/2020 | Takahashi et al. |
| 2007/0155894 A1* | 7/2007 | Izumi ................ C08G 18/0823 524/591 |

FOREIGN PATENT DOCUMENTS

| | | |
|---|---|---|
| EP | 0114185 A1 | 8/1984 |
| EP | 0301510 A2 | 2/1989 |
| EP | 1382622 A1 | 1/2004 |
| EP | 1681328 A2 | 7/2006 |
| EP | 2016150 B1 | 10/2009 |
| EP | 2348061 A1 | 7/2011 |
| FR | 2863623 A1 | 6/2005 |
| JP | H05230364 A | 9/1993 |
| JP | 2003147041 A | 5/2003 |
| JP | 2010241953 A | 10/2010 |
| JP | 2011126945 A | 6/2011 |
| WO | 2008083991 A1 | 7/2008 |
| WO | 2011089154 A2 | 7/2011 |
| WO | 2015019598 A1 | 2/2015 |

OTHER PUBLICATIONS

Liang Zengtian, Coating Used for Polyolefin Plastics, Scientific and Technical Documentation Press, pp. 198 and 199, published Mar. 3, 2006.

Xiang Ming, Adhesive Basics and Formula Design, Chemical Industry Press, p. 42, published Jan. 2002.

* cited by examiner

AQUEOUS POLYURETHANE DISPERSIONS

The present invention relates to aqueous polyurethane dispersions that can be used as adhesives or coatings, are surfactant and solvent free and have low VOC emissions, are environmentally friendly, and provide for homogeneous and aging-resistant adhesives after drying. Also encompassed are processes for their production, compositions containing them and their use as coatings and adhesives.

Polyurethane waterborne dispersions are innovative materials that provide chemical resistance, good film formation properties, toughness, flexibility and superior low-temperature impact resistance. Hence, these latexes are suitable candidates to be used as adhesives or coatings for various substrates, such as wood, rubber, leather or acrylonitrile-butadiene-styrene (ABS).

However, the adhesion to low energy surfaces, i.e. polyolefins used in car lamination applications, remains challenging for systems purely based on polar polymers, such as polyurethanes, polyacrylates or cyanoacrylates, due to the lack of interaction and compatibility of film and substrate. In order to overcome this problem, the use of primers or additives is generally required; however, this commonly entails costly and time-consuming procedures or utilization of organic solvents.

Other approaches have used modified polyolefins, such as polydienes including maleated and/or halogenated polyolefin derivatives, for blending with the polyurethane dispersions. However, since both polymers are not miscible at molecular level, the blending generally results in films with low quality and phase separation.

Another approach is based on water-based polyurethane-acrylate hybrid dispersions. EP 2 348 061 A1, for example, describes polyurethane polyacrylate hybrid systems that are produced by combining a polyurethane with ethylenically unsaturated monomers and subsequently polymerizing the ethylenically unsaturated monomers. However, the use of hybrid systems is more complex and difficult to upscale.

Consequently, there exists still need in the art for improved polyurethane-based adhesive systems that overcome at least some of the drawbacks of known systems.

The present invention described herein solves some of the known issues, allowing the production of waterborne polyurethane dispersions that are suitable for bonding substrates with low surface energies in an environmentally friendly process without surfactants. The invention generally relates to a method to produce a dispersion of polyurethane particles in water, without using any surfactants, by applying shear forces. To obtain stable dispersions, anionic stabilizers are incorporated into the polyurethane chain, not affecting the water resistance of the final product. In addition, the polyurethane chain includes nonpolar building blocks that impart compatibility with nonpolar surfaces.

In a first aspect, the present invention thus relates to a process for manufacturing an aqueous polyurethane dispersion (PUD), the process including:
(1) forming an NCO-terminated polyurethane prepolymer from a reaction mixture comprising:
   (a) at least one polyol with a number average molecular weight $M_n$ in the range of 400 to 10000 g/mol, preferably 500 g/mol to 4000 g/mol, more preferably 1000 g/mol to 3000 g/mol, wherein said at least one polyol comprises at least one partially hydrogenated polybutadiene polyol;
   (b) optionally at least one modified polyether polyol, preferably a halogenated polyether polyol;
   (c) at least one anionic stabilizer, wherein the at least one anionic stabilizer comprises at least two hydroxyl groups and at least one negatively charged functional group, preferably a carboxyl or sulfonic acid group;
   (d) at least two aliphatic polyisocyanates, preferably at least two aliphatic di- and/or triisocyanates, wherein the at least two aliphatic polyisocyanates comprise at least one linear aliphatic polyisocyanate and at least one branched aliphatic polyisocyanate, and wherein the polyisocyanates are used in a total amount resulting in a molar excess of isocyanato groups relative to the hydroxy groups of the other components of the reaction mixture to obtain an NCO-terminated polyurethane prepolymer;
(2) dispersing the prepolymer into a continuous aqueous phase under application of shear forces, preferably by mechanical stirring, to obtain an emulsion;
(3) reacting the prepolymer with at least one chain extension agent to obtain an aqueous polyurethane dispersion; and
(4) blending the aqueous polyurethane dispersion with a non-polar adhesion promoter selected from the group consisting of (modified) polyolefins, polyacrylic resins and rosin-based resins, preferably maleated polyolefins.

In another aspect, the invention relates to the aqueous polyurethane dispersion obtainable according to the process described herein.

Further aspects of the invention relate to adhesive or coating compositions that contain the aqueous polyurethane dispersion disclosed herein and the use of the aqueous polyurethane dispersion in adhesives and coatings.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present, but does not mean that only one molecule of said polyol is present.

If reference is made herein to a molecular weight, this reference refers to the average number molecular weight $M_n$, if not explicitly stated otherwise. The number average molecular weight $M_n$ can be calculated based on end group analysis (OH numbers according to DIN 53240) or can be determined by gel permeation chromatography according to DIN 55672-1:2007-08 with THF as the eluent. If not stated otherwise, all given molecular weights are those determined by end group analysis. The weight average molecular weight $M_w$ can be determined by GPC, as described for $M_n$.

All percentages given herein in relation to the compositions or formulations relate to weight % relative to the total weight of the respective composition or formula, if not explicitly stated otherwise.

The at least one polyol (a) is a non-functionalized polyol, i.e. contains no functional groups besides the hydroxyl groups. Specifically, it does not contain halogen groups to distinguish it from polyol (b). In various embodiments, it does also not contain vinyl groups. The polyol (a) comprises at least one partially hydrogenated polybutadiene polyol and may additionally comprise at least one polyester polyol, at least one polycarbonate polyol, at least one polyether polyol, or a mixture of any two or more of the afore-mentioned polyols. Particularly preferred are mixtures of at least one polybutadiene polyol with one or more polyester polyols. If a mixture of polyester and polybutadiene polyols is used, the weight ratio may range from about 10:1 to 1:10, preferably 1:2 to 2:1.

Polyester polyols that are useful in the processes described herein include those that are obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid or sebacic acid, phthalic acid, isophthalic acid, trimellitic acid, phthalic acid anhydride, tetrahydrophthalic acid anhydride, glutaric acid anhydride, maleic acid, maleic acid anhydride, fumaric acid, dimeric fatty acid and dimethyl terephthalate. Examples of suitable polyols are monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-otaneglycol cyclohexanedimethanol, 2-methylpropane-1,3-diol, dithyleneglycol, triethyleneglycol, tetraethyleneglycol, polyethyleneglycol, dipropyleneglycol, polypropyleneglycol, polypropyleneglycol, dibutyleneglycol and polybutyleneglycol. Alternatively, they may be obtained by ring-opening polymerization of cyclic esters, preferably ε-caprolactone.

In various embodiments, the polyester polyol has a melting temperature $T_m > 0°$ C., preferably $>40°$ C. and/or has an average number molecular weight $M_n$ in the range of 400 to 5000, preferably 500 to 3000 g/mol, more preferably 800-2500 g/mol, most preferably 1000 to 2000 g/mol.

The polyether polyol may be a polyalkylene glycol homo- or copolymer, preferably a polypropylene glycol homo- or copolymer, a polyethylene glycol homo- or copolymer, a polytetramethylene glycol homo- or copolymer, or a polypropylenglycol/polyethyleneglycol block copolymer. In various embodiments, the polyether polyol has an average number molecular weight $M_n$ of 400 to 4000, preferably 400 to 3000 g/mol.

The polybutadiene polyols are partially hydrogenated, i.e. do essentially not contain any ethylenically unsaturated groups. The hydrogenation rate of the partially hydrogenated polybutadiene polyols is at least 95%, preferably at least 96%, more preferably at least 97%. The polybutadiene polyol is preferably a non-branched hydrogenated hydroxyl-terminated polybutadiene, i.e. a polybutadiene diol, with low molecular weight, preferably having a weight average molecular weight, $M_w$, of about 1000 to 20,000, more preferably about 1000 to 5,000, and a 1,2-vinyl content of about 5 mol percent or less, with an average hydroxyl functionality less than or equal to 2 per molecule. These non-branched polybutadienes are preferably derived from anionic polymerization and the hydroxyl groups can be primary or secondary. In preferred embodiments, the polybutadiene polyol is combined with at least one other polyol (a), preferably a polyester polyol, as defined above.

Suitable polycarbonates can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-pro-panediol, 2,2,4-trimethyl pentanediol-1,3, dipropylene glycol, polypropylene glycols, dibutylene glycol, polybutylene glycols, bisphenol A, tetrabromobisphenol A as well as lactone-modified diols. The diol component preferably contains 40 to 100 wt. % hexanediol, preferably 1,6-hexanediol and/or hexanediol derivatives. More preferably the diol component includes examples that in addition to terminal OH groups display ether or ester groups.

The hydroxyl polycarbonates should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2,4, trimethylol propane, pentaerythritol, quinitol, mannitol, and sorbitol, methyl glycoside, 1,3,4,6-dianhydrohexites.

Suitable polycarbonate polyols are, without limitation, those obtainable under the trademark names Desmophen® C3200 (Bayer) and Kuraray® C2050 (Poly-(3-methyl-1,5-pentanediol, 1,6-hexanediol)carbonate; Kuraray).

The reaction mixture may further comprise monomeric diols, such as 1,4-butanediol.

In preferred embodiments, the reaction mixture further comprises at least one modified polyether polyol (b), in particular a halogenated polyether polyol, such as chlorinated, brominated and/or fluorinated polyether polyols. The modified polyether polyol may also be maleated or maleated and halogenated. "Maleated", as used in this context, means that the polyether is grafted with maleic anhydride. These modified polyether polyols provide for an increased adhesion to surfaces with low surface energy due to their nonpolar properties. The modified polyether polyol is preferably based on the polyether polyols described above, such as polyethylene glycol or polypropylene glycol or copolymers thereof. If a mixture of such a modified polyether polyol with polyester and polybutadiene polyols is used, the weight ratio may range from about 10:1:1 to 1:10:1 to 1:1:10, preferably 1:2:1 to 2:1:1 to 1:1:2.

While it is preferred that the modified polyether polyol as defined above is present, in some embodiments it is not included. In such embodiments, the at least one polybutadiene polyol alone provides for the desired compatibility with low surface energy surfaces.

The reaction mixture further comprises at least one anionic stabilizer, wherein the at least one anionic stabilizer comprises at least two hydroxyl groups and at least one negatively charged functional group, preferably a carboxyl or sulfonic acid group.

The term "stabilizer", as used herein in the context of anionic and nonionic stabilizers, relates to a class of molecules that can stabilize the droplets in a dispersion or emulsion, i.e. prevent coagulation or coalescence. In various embodiments, the stabilizer molecules comprise a hydrophilic and a hydrophobic part, with the hydrophobic part interacting with the droplet and the hydrophilic part be exposed to the solvent. While commonly used stabilizers are surfactants and may bear an electric charge, for example may be anionic surfactants or cationic surfactants, or may, alternatively, be non-ionic, the present invention avoids the use of surfactants, but uses stabilizer compounds that are built into the polyurethane polymer during (pre)polymer formation that provide for self-emulsifiable polyurethanes which spontaneously form stable dispersions in water without the assistance of external emulsifiers and exhibit increased stability.

The stabilizers used herein comprise anionic groups. The presence of such charged groups increases the stability of the dispersed polymer droplets or particles. Suitable anionic groups include, but are not limited to acidic groups, such as carboxylic acid or sulfonic acid groups and their respective salts. Concrete compounds suitable as anionic stabilizers in the sense of the present invention are 2,2-bis(hydroxyalkyl) alkane monocarboxylic acids, in particular 2,2-bis(hydroxymethyl)alkane monocarboxylic acids with a total carbon atom number of 5-8, such as 2,2-bis(hydroxymethyl) propionic acid (dimethylol propionic acid; DMPA). Also suitable are sulfonated polydiols with a molecular weight $M_w$ in the range of up to 1000 g/mol, preferably up to 500 g/mol. Such sulfonated polydiols, for example propoxylated 1-methyl-2-methylol-3-hydroxy-1-propanesulfonate with a molecular weight $M_w$ of about 430 g/mol, are commercially available under the name GS-7Q (Yedang G & Co. Ltd).

In various embodiments, the above-described anionic stabilizers are combined with other compounds that can act as stabilizers, in particular nonionic stabilizers. In various embodiments, such nonionic stabilizers comprise polyols, preferably diols, or a mixture of different polyols and/or diols, including the monomeric diols and certain polyether polyols that have been described above in connection with the polyol (a). Such nonionic stabilizers have HLB (hydrophile lipophile balance) values between 6 and 19. The HLB values are calculated by calculating the molecular weight of the hydrophilic portion of the molecule and dividing said molecular weight of the hydrophilic part of the molecule by the total molecular weight of the molecule and then dividing the obtained percentage by 5. Typical nonionic stabilizers for oil-in-water emulsions have HLB values of 8-18. Preferred monomeric diols are glycols, such as ethylene glycol, propylene glycol, butylene glycol, neopentyl glycol and the like and (as polyether polyols) polymers thereof, such as polyethylene glycol, polypropylene glycol, and polybutylene glycol and copolymers of ethylene glycol, propylene glycol, and butylene glycol, preferably of ethylene glycol and propylene glycol. The average molecular weight $M_w$ of such polymeric stabilizers is preferably in the range of up to about 4000 g/mol, preferably up to about 3000 g/mol, more preferably up to about 2000 g/mol. Suitable non-ionic ethylene glycol/propylene glycol stabilizers are for example those commercially available under the trademark name Pluronic® from BASF, for example Pluronic PE3500.

In preferred embodiments of the invention, the at least one anionic stabilizer, such as DMPA and/or a sulfonated polydiol, is combined with a nonionic polyol stabilizer, preferably diol stabilizer, as defined above. In one specific embodiment, the mixture comprises at least one ethyleneglycol/propyleneglycol copolymer with a molecular weight $M_w$ of up to 3000 g/mol and at least one anionic diol stabilizer, preferably DMPA or a sulfonated polydiol or both.

In such mixtures, the weight ratio of non-ionic to anionic stabilizer usually ranges from about 0:1 to about 20:1, preferably about 2:1 to 1:3.

The term "reaction mixture", as used herein, relates to the mixture of the polyols, including the stabilizer(s) and the polyisocyanate(s). "Polyol mixture", as used herein in relation to the mixture comprising the polyols, relates to a mixture comprising the at least one polyol (a), optionally the at least one modified polyether polyol, the at least one stabilizer, and, optionally, any additional polyols that may be present.

It is preferred that the polyol mixture does not contain any organic solvents or surfactants and no further additives, i.e. consists of polyols, preferably those defined above, and the stabilizers and optionally the (modified) polyolefins, polyacrylic resins, rosin-based resins or derivatives thereof defined below.

In various embodiments, the polyol mixture comprises about 20 to about 99 wt.-%, preferably 30 to 85 wt.-%, of the at least one polyol (a), preferably a mixture of different polyols, for example of polyester polyols, polybutadiene polyols and polyether polyols, relative to the weight of the polyol mixture. The at least one polyol (a) may comprise a nonionic stabilizer polyol as defined above.

The modified polyether polyol is, if present, in various embodiments, used in amounts of up to 15 wt.-%, relative to the weight of the polyol mixture, preferably 4-10 wt.-%.

In various embodiments, the nonpolar polyols, i.e. polybutadiene polyols and, optionally, the modified polyether polyols, such as halogenated polyether polyols, are used in amounts of up to 35, preferably up to 30, more preferably up to 25 wt.-% relative to the total weight of the polyol mixture. The lower limit is, in some embodiments, 5 wt.-%, preferably at least 10 wt.-%. It is generally preferred that these nonpolar polyols are blended with polar polyols, such as the polyester and polyether polyols defined above, with the nonpolar polyols being contained in amounts of up to 35, preferably up to 30, more preferably up to 25 wt.-% relative to the total weight of the polyol mixture and the remainder being polar polyols and stabilizers.

The anionic stabilizer is usually contained in amounts of about 1 to 20 wt.-%, preferably 2 to 5 wt.-%, more preferably 2 to 4.5 wt.-% relative to the weight of the polyol mixture. If a mixture of stabilizing compounds is employed, anionic stabilizers as defined above, may be used in amounts of 1 to 15 wt.-% and non-ionic stabilizers in amounts of 1 to 30 wt.-% relative to the polyol mixture. In various embodiments, the anionic stabilizers as defined above, may be used in amounts of 2 to 5 wt.-%, preferably 2 to 4.5 wt.-%, and non-ionic stabilizers in amounts of 2 to 4 wt.-%, preferably 2 to 3 wt.-%, relative to the polyol mixture.

The final reactant employed in the formation of the polyurethane prepolymer is a mixture of at least two aliphatic polyisocyanates, wherein the at least two aliphatic polyisocyanates comprise at least one linear aliphatic polyisocyanate and at least one branched aliphatic polyisocyanate. Any compound which includes at least two isocyanate groups is within the contemplation of the present invention. It is preferable, however, that the polyisocyanate be a diisocyanate. The incorporation of small amounts of isocyanate with a functionality higher than two, in particular a triisocyanate, is also contemplated and may under certain circumstances even be advantageous. Such polyisocyanates can act as cross-linkers. In this case where the polyisocyanate acts as a cross-linker, polyisocyanates based on hexamethylene diisocyanate are preferred. Suitable diisocyanates include, without limitation, hexamethylene diisocyanate (HDI), isophorone diisocyanate (IPDI), methylene-4,4-bis(cyclohexyl)diisocyanate (H12MDI) and mixtures thereof. Besides the aliphatic polyisocyanates, also aromatic polyisocyanates, in particular methylenediphenyl diisocyanate (MDI), toluene-2,4-diisocyanate (TDI), polymeric diphenylmethane diisocyanate (PMDI), and mixtures thereof might be present. In a particularly preferred embodiment, only aliphatic polyisocyanates, in particular only aliphatic diisocyanates are present. Among particularly preferred aliphatic diisocyanates are isophorone diisocyanate, hexamethylene diisocyanate, and mixtures thereof. Suitable polyisocyanates are, for example, commercially available under the trademark name Desmodur® from Bayer AG (DE).

In preferred embodiments, the at least two aliphatic polyisocyanates comprise at least one linear aliphatic polyisocyanate and at least one branched aliphatic polyisocyanate in a weight ratio of 2:1 to 1.2:1, more preferably about 1.5:1.

The polyisocyanates are used in such a total amount to result in a molar excess of isocyanato groups of all polyisocyanates relative to the OH groups of all polyols present in the reaction mixture, i.e. in a concentration in excess of the stoichiometric concentration required to completely react with the hydroxyl groups, the OH/NCO equivalent ratio preferably being 1:1.1 to 1:4, more preferably 1:1.2 to 1:1.3. In case besides the aliphatic polyisocyanates also one or more aromatic polyisocyanate is present, the total amount of polyisocyanates refers to the amount of both, all aliphatic polyisocyanates, and all aromatic polyisocyanates present in the reaction mixture. Preferably, the amount of the polyisocyanates is 20% to 150% in excess of the stoichiometric concentration required to completely react with the hydroxyl groups. The amount of the polyisocyanates in the reaction mixture is typically in the range of 10 to 30 wt.-% relative to the reaction mixture. The remainder of the reaction mixture may be made up by the polyol mixture, as defined above.

Providing the polyol mixture may include the step of mixing the polyols (a) and, optionally, (b) and the stabilizers and heating the mixture. The heating may be required in case the polyols employed are solid at room temperature and need to be melted to form the polyol mixture. In preferred embodiments, the polyols and the at least one stabilizer are combined and heated to about 70 to 95° C., for example about 75° C., while stirring the mixture under vacuum to dry. After the mixing, the mixture may be cooled to 60° C. for the addition of the isocyanates.

"About", as used herein, relates to ±10%, preferably ±5% of the numerical value to which it refers. "About 70° C." thus relates to 70±7, preferably 70±3.5° C.

The polyol mixture is subsequently combined with the polyisocyanates in the reaction mixture to form the prepolymer. The prepolymer reaction usually occurs at elevated temperature, preferably in the range of between about 60° C. and about 95° C., more preferably about 60-80° C., over a period of between about 1 and about 24 hours. The reaction is typically carried out in the presence of a catalyst that is added, preferably a tin-based catalyst, more preferably dimethyldineodecanoatetin, such as Fomrez UL28. In preferred embodiments of the invention, the reaction mixture thus further comprises a catalyst as defined above.

The reaction continues until the free isocyanate content reaches or comes very close to the calculated value, as determined by standard titration with dibutylamine. Preferred values for the free isocyanate content in the prepolymer are in the range between 0.2 and 3 wt.-%, preferably 1 to 2 wt.-% relative to the total amount of polyols, including the stabilizer(s), and polyisocyanates in the mixture.

Once the free isocyanate content reaches the predetermined value, as defined above, the temperature may be reduced, for example to about 60° C.

In various embodiments, the prepolymer has an average number molecular weight $M_n$ of 3000 to 30000, preferably 11000 to 25000, more preferably 12000 to 20000 g/mol.

The obtained prepolymer is then dissolved in a solvent. Preferred are organic solvents, in particular those being fully miscible with water, such as acetone. In various embodiments, such solvents, in particular acetone, are used in amounts of up to 70 wt.-%, preferably up to 60 wt.-%, more preferably up to 55 wt.-% relative to the prepolymer/solvent mixture. The solvent is preferably removed after step (3), for example by vacuum distillation. To dissolve the prepolymer, the solution may be heated, for example to a temperature of 40 to 70° C., preferably 50 and 60° C., preferably under stirring.

In various embodiments, the prepolymer may be neutralized at this stage by using a suitable neutralization agent. In case an anionic acidic stabilizer is used, an amine base, such as triethylamine may be used.

The thus formed prepolymer solution is then dispersed into a continuous aqueous phase, preferably water. The dispersing step may be carried out at elevated temperature, for example in the range of about 30 to 60° C., for example at about 40° C. The dispersing step may include emulsifying the polyurethane prepolymer into a continuous aqueous phase, preferably water, to form an emulsion, preferably under the action of a shear force. In various embodiments, the shear force is brought about by means of mechanical stirring only, for example using a mechanical stirrer at up 900 rpm, for example 300-700 rpm, preferably 400-600 rpm.

The term "emulsion", as used herein, relates to oil-in-water (O/W) emulsions, i.e. emulsions in which water is used in excess and is the continuous medium. In the described processes, stable droplets are obtained, which have typically a size between 50 and 500 nm, preferably between 100 and 400 nm, as determined by dynamic light scattering (DLS) according to ISO 22412.

In various embodiments, the reaction mixture in step (1) additionally comprises at least one (modified) polyolefin, polyacrylic or rosin-based resin. Alternatively or additionally, at least one (modified) polyolefin, polyacrylic or rosin-based resin is incorporated into the continuous aqueous phase in step (2), for example by blending it with the prepolymer (solution) and dispersing the blend into the continuous phase or by separately dispersing the at least one (modified) polyolefin, polyacrylic or rosin-based resin into the continuous aqueous phase or by using a preformed dispersion of the at least one (modified) polyolefin, polyacrylic or rosin-based resin that is then combined with the aqueous phase. The (modified) polyolefin, polyacrylic or rosin-based resins can comprise highly polar and highly unpolar segments, which increase the compatibility between the forming adhesive and highly unpolar substrates to be bonded by the adhesive. The terms "highly polar segments" and "highly unpolar segments", respectively, relate to parts or regions of the resins that are highly polar and highly unpolar, respectively. The length of said segments is not particularly limited and the resins may be block copolymers of highly polar and highly unpolar monomeric units, but also statistical polymers as long as the resulting polymers possess the desired compatibility. It is however preferred that the respective polymers/resins are block copolymers comprising highly polar and highly unpolar segments.

As described above, the (modified) polyolefins, polyacrylics or rosin-based resins are included in the reaction mixture in step (1) of the inventive method, or are added together with the prepolymer in step (2), for example solved in the prepolymer solution, or provided in the continuous aqueous phase and added with the water in step (2), for example in form of a dispersion or emulsion. Introducing the (modified) polyolefins, polyacrylics or rosin-based resins in these steps of the method ensures that they are mixed at molecular level with the forming (pre)polymer, which is dissolved in the solvent during the dispersing step, thus obtaining particles with the polyolefins/polyacrylics/rosin resins blended inside the particles.

Accordingly, the polyurethane polymer particles may be a blend of a polyurethane and the (modified) polyolefin, polyacrylic or rosin-based resin. These blends are also referred to herein as polyurethane/(modified) polyolefin, polyacrylic or rosin-based resin polymer dispersions.

While above reference is made to the (modified) polyolefins, polyacrylic and rosin-based resins as alternatives, it is understood that in certain embodiments, at least one of two or each of the compound classes may be used and, for example, blended into the prepolymer dispersion.

The polyolefins are preferably polyethylene, polypropylene, polybutadiene, polyisoprene, polystyrene or copolymers of any two or more thereof, optionally modified, for example halogenated or modified such that the polymer includes a carboxyl group. The polyolefins may also be modified with a resin, such as maleic resin. In preferred embodiments, the (modified) polyolefins are selected from halogenated polyolefin maleic acid copolymer, such as chlorinated polypropylene maleic resin, polyolefin maleic acid copolymer, styrene/ethylene-butylene, styrene/butadiene, styrene/ethylene-propylene, or styrene/isoprene copolymers. Suitable polyolefins are commercially available from Toyobo Co., Ltd. under the trademark names Hardlen® NZ-1004, NZ-1015, Hardlen® EH-801J and Hardlen® CY-9124/9122, and from KRATON Performance Polymers Inc. under the trademark names Kraton® G1643E and Kraton® G1640ES.

The term "polyacrylic resin", as used herein, relates to (meth)acrylate-based resins that are preferably copolymers of (meth)acrylate esters and (meth)acrylic acid. The (meth) acrylate esters may be hydrophobic (meth)acrylate esters, such as butyl (meth)acrylate or 2-ethylhexyl (meth)acrylate. Preferably, said polyacrylic resins comprise carboxylic acid groups that provide for the polar segments of the polymer. In various embodiments, said polyacrylic resins are provided in form of aqueous dispersions. Suitable commercially available resins include, without limitation, Acronal® A225 (BASF, SE).

The terms "rosin resin" or "rosin-based resins", as interchangeably used herein, relate to resins derived from rosin. Rosin is a natural product from conifers. The gum rosin, which is the preferred rosin, according to the present invention, is a blend of 8 rosin acids, namely abietic acid, neobiabietic acid, dehydroabietic acid, palustric acid, levopimaric acid, pimaric acid, isopimaric acid and sandaracopimaric acid. The rosin may be modified by hydrogenation, esterification, preferably with alcohols, such as methanol, triethylene glycol, glycerol and pentaerythritol, dimerization, and functionalization. Functionalization preferably refers to further esterification of rosin esters (with polyols), such as those mentioned above, with diacids, such as maleic acid or fumaric acid. Preferred rosin-based resins in the sense of the present invention are rosin acid resins and rosin ester resins. Rosin acid resins include the rosin acids mentioned above, optionally also in (partially) hydrogenated or dimerized form, or rosin esters functionalized with dicarboxylic acids, preferably maleic acid. Rosin-ester resins include the esters of the rosin acids described above with polyols, such as triethylene glycol, glycerol or pentaerythritol. These esters can be dispersed in water using surfactants, thus yielding rosin-ester resin dispersions. Suitable rosin resins are for example available under the trademark names Staybelite™ A rosin acid (Pinova Inc.), Staybelite™ E rosin ester (Eastman) and PEXALYN® T100 (Pinova Inc), and suitable rosin dispersions are for example available under the trademark names Tacolyn® 3509E, Tacolyn® 3166, Tacolyn® 3179H, Snowtack® 765A and Snowtack®779F.

During chain extension in step (3), the isocyanate endgroups of the prepolymer are reacted with an appropriate chain extender containing at least two terminal NCO-reactive groups, for example a diamine, such as hydrazine, an alkylene diamine or cycloalkylene diamine or silane-containing diamine, preferably ethylene diamine, isophorone diamine, piperazine, or polyetheramine. Diols, such as an alkyldiol, including but not limited to 1,4-butanediol and 2-butyl-2-ethyl-1,3-propanediol, or water can also be used. The afore-mentioned chain extension reagents may also be combined with an endcapping reagent, such as a silane-containing amine, including, without limitation (3-aminopropyl)triethoxysilane (APTES). Silane-containing amines can further promote substrate adhesion. The chain extension reaction may be performed until essentially total conversion of the isocyanate groups, i.e. the chain extension agent is continuously added until free isocyanate groups are no longer detectable. It is generally preferred that the chain extension reaction is carried out until total conversion of the isocyanate groups. The conversion can be monitored by techniques well-established in the art, for example IR spectroscopy.

The presence of a catalyst and/or higher temperature may also be required. Preferred chain extension agents useful according to the present invention include ethylene diamine, water, isophorone diamine, and/or a polyetherdiamine.

The aqueous polyurethane dispersion formed preferably has a solid content of 30 to 60 wt.-%, preferably 38 to 48 wt.-%. The viscosity is preferably in the range of 50 to 10000 mPas, preferably 100 to 1000 mPas as determined by a Brookfield viscosimeter, spindle 4, 20 rpm. The viscosity may be adjusted to suit the desired application form by adding a thickener. Suitable viscosity adjusting and thickening agents are well-known in the art. The particle size as determined by dynamic light scattering (DLS) is preferably in the range of 50 to 500 nm, more preferably 100 to 400 nm. The application drying temperature can range from 20 to 100° C., but preferably is about 20 to 85° C., more preferably 50 to 80° C.

To provide for sufficient adhesiveness on specific highly unpolar materials, the aqueous polyurethane dispersions is then blended with at least one rosin resin dispersion, at least one polyacrylic resin dispersion and/or at least one (modified) polyolefin resin. The resulting blend further increases the compatibility between the synthesized dispersions and the highly unpolar materials. For this type of blending, the same (modified) polyolefins, polyacrylic or rosin-based resins that have been described above in connection with the polymer dispersions may be used. These resins are preferably used in form of aqueous dispersions. Particularly preferred are maleic, i.e. maleated, polyolefins. In various embodiments, the PU dispersions are blended with the resin dispersions in a weight ratio of 10:1 to 1:1, preferably 4:1 to 2:1, more preferably about 3:1.

The present invention also relates to adhesive compositions that comprise the aqueous polyurethane or polyurethane/(modified) polyolefin, polyacrylic or rosin-based resin dispersions that have blended with at least one further (aqueous) rosin-based resin dispersion, at least one (aqueous) polyacrylic resin dispersion and/or at least one further (modified) polyolefin resin.

The dispersion may then be used as an adhesive or coating, in particular coatings/adhesives for highly unpolar materials, such as polypropylene or polypropylene/ethylene propylene diene monomer (PP/EPDM), PVC and polypropylene foams, as well as polyurethane foams and polyurethane leather, and hence are particularly suitable for application in car manufacturing processes. The use of the polymers and compositions disclosed herein for car interior laminating applications thus also forms parts of the present invention.

Such adhesive or coating compositions can contain further ingredients all of which are well-known in the field. It is however preferred that neither the dispersions nor the final compositions containing the dispersions contain organic solvents. Accordingly, as described above, in case a solvent has been used for the dispersion of the PU prepolymer, said solvent is removed after chain extension, such that, in various embodiments, the dispersions and/or compositions are essentially free of organic solvents. "Essentially free", as used in this context, means that the dispersion and/or composition contains less than 5 wt.-% of the given component, preferably less than 2 wt-%, more preferably less than 1 wt.-%.

The adhesives containing the dispersions described herein show good adhesive strength, while being solvent free and thus environmentally friendly.

The adhesives can be applied to the substrate by all known techniques, including without limitation, spraying, painting, dip-coating, spin-coating, printing and the like.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

EXAMPLES

Example 1

Realkyd 20112 polyester polyol (71.26 g), Krasol HLBH-P 2000 97% saturated polybutadiene polyol (18.78 g), GS-7Q (1.99 g) and DMPA (0.67 g) anionic stabilizers, HN8200 (4.1 g) nonionic stabilizer were placed in a 500 mL three necked round bottom flask equipped with a condenser and a mechanical stirrer. The mixture was heated to 85° C. At this temperature, the solid components melted and a homogeneous mixture was obtained. At this point, high vacuum was applied (<0.1 mbar) while the temperature was set to 80° C. in order to remove water. The mixture was left stirring under vacuum at 80° C. for two to three hours.

Once dried, the vacuum was stopped and the mixture was flushed with argon, cooled to 60° C. and IPDI (isophorone diisocyanate, 5.15 g) and HDI (hexamethylene diisocyanate, 7.62 g) were added to the mixture (3-6° C. temperature increase was observed).

Then the catalyst (dimethyldineodecanoatetin, 5 mg of a freshly prepared tin catalyst (Fomrez UL-28)/acetone mixture (5 ml)) was added. Upon addition of the catalyst, the temperature raised rapidly some degrees. When the temperature increase stopped (at about 70° C.), the heating was set to 80° C. and once at this temperature, it was stirred for 3 hours.

The reaction mixture was left stirring at 60° C. overnight and NCO-content measured next morning: 1.03% NCO indicating that the reaction was complete.

Then 132 g acetone were added to dissolve the prepolymer, and 10 minutes later 0.45 g triethylamine (TEA) in 5 g acetone to neutralize the carboxyl groups of DMPA and sulfonyl groups of GS-7Q.

10 minutes later the emulsification process was carried out as follows: The total amount of prepolymer solution was mixed with warm water (109 g) to obtain a mixture 44/56 by weight of PU acetone solution/water. The mixture was emulsified by mechanical stirring at 600 rpm for 20 min.

Then, the chain extension was performed by placing the resulting emulsion in a round bottom flask with mechanical stirrer and ethylene diamine (EDA, 10% in water) and APTES ((3-aminopropyl)triethoxysilane, equimolar) was added until no residual NCO was detected in IR.

The resulting dispersion was left overnight to cool down to room temperature. Next day, dispersion was filtered, the particle size was measured and the residual coagulate filtered. Finally, this emulsion was blended with 25 wt.-% resin (Toyobo NZ-1004) and stirred until it was fully homogenized.

Example 2

Realkyd 20112 polyester polyol (70.85 g), Krasol HLBH-P 2000 97% saturated polybutadiene polyol (18.8 g), IXOL M125 (4.8 g), Pexalyn (5.45 g), DMPA (0.5 g), GS-7Q (2.01 g) as anionic stabilizer and HN8200 (4.22 g) non-ionic stabilizers were placed in a 500 mL three-necked round bottom flask equipped with a condenser and a mechanical stirrer. The mixture was heated to 85° C. At this temperature, the solid components melted and a homogeneous mixture was obtained. At this point, high vacuum was applied (<0.1 mbar) while the temperature was set to 80° C. in order to remove water. The mixture was left stirring under vacuum at 80° C. for few hours. After that, vacuum was stopped and flask was flushed with Argon. The temperature was decreased to 60° C. and then, IPDI (isophorone diisocyanate, 5.98 g) and HDI (hexamethylene diisocyanate, 8.7 g) was also added (3-6° C. temperature increased was observed).

Then, 5 mg of a freshly prepared Tin catalyst/acetone (5 mL) was added. Upon addition of the catalyst, the temperature raised rapidly to some degrees. When the temperature increase stopped (at around 70° C.), the heating was set to 80° C. and once at this temperature, it was stirred for 3 hours.

The reaction mixture was left stirring at 60° C. overnight and NCO content was measured again next morning: 0.7% NCO, indicates the reaction is complete. Then, 148 g of acetone were added to dissolve the prepolymer, and 10 minutes later, 0.37 g triethylamine (TEA) in 5 g acetone. 10 minutes later, emulsification was carried out: the warm prepolymer mixture was mixed with 128 g warm water and Tacolyn 3509E (10.74 g) to obtain a mixture 44/56 of acetone solution/water for 20 minutes at 600 rpm.

Then, the chain extension was performed; the resulting emulsion was placed in a round bottom flask with mechanical stirrer and Jeffamine T-403 (polyether triamine) (10% in water) was added until no NCO was detected in IR spectrum.

The resulting dispersions were left overnight to cool down at room temperature. Next day, dispersion was filtered, particles size was measured and the residual coagulate was filtered.

Example 3

Realkyd 20112 polyester polyol (71.25 g), Krasol HLBH-P 2000 97% saturated polybutadiene polyol (20.90 g), IXOL M125 halogenated polyether polyol (4.6 g), GS-7Q (2.51 g) and DMPA (0.62 g) anionic stabilizers, HN8200 (5.05 g) nonionic stabilizer were placed in a 500 mL three necked round bottom flask equipped with a condenser and a mechanical stirrer. The mixture was heated to 85° C. At this temperature, the solid components melted and a homogeneous mixture was obtained. At this point, high vacuum was applied (<0.1 mbar) while the temperature was set to 80° C. in order to remove water. The mixture was left stirring under vacuum at 80° C. for two to three hours.

Once dried, the vacuum was stopped and the mixture was flushed with argon, cooled to 60° C. and Desmodur DN980 (0.41 g), IPDI (isophorone diisocyanate, 6.28 g) and HDI (hexamethylene diisocyanate, 9.43 g) were added to the mixture (3-6° C. temperature increase was observed).

Then the catalyst (dimethyldineodecanoatetin, 5 mg of a freshly prepared tin catalyst (Fomrez UL-28)/acetone mixture (5 ml)) was added. Upon addition of the catalyst, the temperature raised rapidly some degrees. When the temperature increase stopped (at about 70° C.), the heating was set to 80° C. and once at this temperature, it was stirred for 3 hours.

The reaction mixture was left stirring at 60° C. overnight and NCO-content measured next morning: 1.05% NCO indicating that the reaction was complete.

Then 154 g acetone were added to dissolve the prepolymer, and 10 minutes later 0.42 g triethylamine (TEA) in 5 g acetone to neutralize the carboxyl groups of DMPA and sulfonyl groups of GS-7Q.

10 minutes later the emulsification process was carried out as follows: The total amount of prepolymer solution was mixed with warm water (147 g) to obtain a mixture 44/56 by weight of PU acetone solution/water. The mixture was emulsified by mechanical stirring at 600 rpm for 20 min.

Then, the chain extension was performed by placing the resulting emulsion in a round bottom flask with mechanical stirrer and Lunacure-MXDA was added until no residual NCO was detected in IR.

The resulting dispersion was left overnight to cool down to room temperature. Next day, dispersion was filtered, the particle size was measured and the residual coagulate filtered. Finally, this emulsion was blended with 25 wt.-% resin (Toyobo NZ-1004) and stirred until it was fully homogenized.

Example 4

Realkyd 20112 polyester polyol (85.7 g), Krasol HLBH-P 2000 97% saturated polybutadiene polyol (22.61 g), GS-7Q (2.51 g), DMPA (0.74 g) anionic stabilizers and HN8200 (4.82 g) non-ionic stabilizers were placed in a 500 mL three-necked round bottom flask equipped with a condenser and a mechanical stirrer. The mixture was heated to 85° C. At this temperature, the solid components melted and a homogeneous mixture was obtained. At this point, high vacuum was applied (<0.1 mbar) while the temperature was set to 80° C. in order to remove water. The mixture was left stirring under vacuum at 80° C. for few hours.

After that, vacuum was stopped and flask was flushed with Argon. The temperature was decreased to 60° C. and then Desmodur DN980 (0.32 g) IPDI (isophorone diisocyanate, 6.15 g) and HDI (hexamethylene diisocyanate, 9.31 g) was also added (3-6° C. temperature increased was observed).

Then, 5 mg of a freshly prepared Tin catalyst/acetone (5 mL) was added. Upon addition of the catalyst, the temperature raised rapidly to some degrees. When the temperature increase stopped (at around 70° C.), the heating was set to 80° C. and once at this temperature, it was stirred for 3 hours.

The reaction mixture was left stirring at 60° C. overnight and NCO content was measured again next morning: 1.05% NCO, indicates the reaction is complete. Then, 140.60 g of acetone were added to dissolve the prepolymer, and 10 minutes later, 0.50 g triethylamine (TEA) in 5 g acetone. 10 minutes later, emulsification was carried out: the warm prepolymer mixture was mixed with 132 g warm water to obtain a mixture 44/56 of acetone solution/water for 20 minutes at 600 rpm.

Then, the chain extension was performed; the resulting emulsion was placed in a round bottom flask with mechanical stirrer and TSPA/EDA was added until no NCO was detected in IR spectrum.

The resulting dispersions were left overnight to cool down at room temperature. Next day, dispersion was filtered, particles size was measured and the residual coagulate was filtered.

Finally, this emulsion was blended with a 25% wt. resin (Auroren S-6375) and stirred until it was fully homogenized.

Example 5 to 8

Examples 5 to 8 were prepared according to the process described in Example 1 with the formulation shown in Table 1.

TABLE 1

| Sample | Polyols (wt. %) | Stabilizers (wt. %) | Isocyanates (wt. %) | Chain extenders |
|---|---|---|---|---|
| Example 5 | Realkyd 20112 (65.0%) Krasol HLBH-P (17.1%) | GS-7Q (1.82%) DMPA (0.61%) HN-8200 (3.74%) | IPDI (4.7%) HDI (6.95%) | APTES/ EDA |
| Example 6 | Realkyd 20112 (65.0%) Krasol HLBH-P (17.2%) | GS-7Q (1.90%) DMPA (0.56%) HN-8200 (3.66%) | IPDI (4.65%) HDI (7.05%) | TSPA/ EDA |
| Example 7 | Realkyd 20112 (64.7%) Krasol HLBH-P (16.5%) | GS-7Q (1.82%) DMPA (0.46%) HN-8200 (3.57%) | IPDI (11.2%) HDI (1.7%) | APTES/ EDA |
| Example 8 | Realkyd 20112 (65.9%) Krasol HLBH-P (17.1%) | GS-7Q (1.83%) DMPA (0.46%) HN-8200 (3.67%) | IPDI (2.8%) HDI (8.25%) | TSPA/ EDA |

The water-based adhesive compositions described in Examples 1-8 were evaluated in terms of particle size and PDI (polydispersity index) by Dynamic Light Scattering (DLS) according to ISO 22412, peeling strength in an Instron® Universal Testing Machine 3166 at the crosshead speed of 100 cm/min, 180°. The materials bonded were polypropylene/polyurethane foam (PP/PU-foam).

Creep tests were performed with substrates (PU-foam and PP; 1.5 cm×7 cm) at 80° C. temperature and 180° angle test. Different loads were applied and detachment was measured after 24 h of experiment.

The results are shown in Table 2.

TABLE 2

| Sample | Particle Size d · nm | PDI | Resin | Blends (resin/PU) | Average Peeling strength (N/cm) | Substrate Failure | Creep Test 80° C. | Loads (g) |
|---|---|---|---|---|---|---|---|---|
| Example 1 | 205 | 0.161 | Hardlen-NZ-1004 | 25/75 | (SF) | YES | Fully detached | 300 |
|  |  |  |  |  |  |  | 24 hour 0.7 cm | 150 |
| Example 2 | 267 | 0.180 | Tacolyn 3509E | 50/50 | 5.32 | NO | Fully detached | 300 |
| Example 3 | 233 | 0.293 | Hardlen-NZ-1004 | 25/75 | (SF) | YES | Fully detached | 300 |
|  |  |  |  |  |  |  | 24 hour 0 cm | 150 |
| Example 4 | 212 | 0.311 | Auroren S-6375 | 25/75 | (SF) | YES | 24 hour 0.2 cm | 150 |
| Example 5 | 206 | 0.161 | Hardlen-NZ-1004 | 25/75 | (SF) | YES | 24 hour 2 cm | 300 |
|  |  |  |  |  |  |  | 24 hour 0.7 cm | 150 |
| Example 6 | 212 | 0.311 | Auroren S-6375 | 25/75 | (SF) | YES | 24 hour 1 cm | 150 |
| Example 7 | 182 | 0.182 | Hardlen-NZ-1004 | 25/75 | (AF) | NO | 24 hour 0.9 cm | 150 |
| Example 8 | 237 | 0.261 | Auroren S-6375 | 25/75 | (AF) | NO | Fully detached | 150 |

SF: substrate failure
AF: adhesive failure

The invention claimed is:

1. A process for manufacturing an aqueous polyurethane dispersion, comprising:
   (1) forming an NCO-terminated polyurethane prepolymer from a reaction mixture comprising:
      (a) at least one polyol with a number average molecular weight $M_n$ in the range of 400 to 10000 g/mol, wherein said at least one polyol comprises at least one partially hydrogenated polybutadiene polyol;
      (b) at least one modified polyether polyol selected from halogenated polyether polyol, maleated polyether polyol or halogenated and maleated polyether polyol;
      (c) at least one anionic stabilizer, wherein the at least one anionic stabilizer comprises at least two hydroxyl groups and at least one negatively charged functional group;
      (d) a polyisocyanate reactant consisting of aliphatic diisocyanates, aliphatic triisocyanates and combinations thereof, the polyisocyanate reactant including at least two aliphatic polyisocyanates selected from the group consisting of linear aliphatic diisocyanate and branched aliphatic diisocyanate, and wherein the polyisocyanates are used in a total amount resulting in a molar excess of isocyanato groups relative to the hydroxy groups of the other components of the reaction mixture to obtain an NCO-terminated polyurethane prepolymer;
   (2) dispersing the prepolymer into a continuous aqueous phase under application of shear forces to obtain an emulsion;
   (3) reacting the prepolymer in the emulsion with at least one chain extension agent to obtain an aqueous polyurethane dispersion; and
   (4) blending the aqueous polyurethane dispersion with a non-polar adhesion promoter selected from the group consisting of polyacrylic resins, rosin-based resins and (modified) polyolefins selected from halogenated polyolefin resin, halogenated polyolefin maleic resin, chlorinated polypropylene maleic resin, polyolefin maleic resin, styrene/ethylene-butylene copolymer, styrene/butadiene copolymer, styrene/ethylene-propylene copolymer and styrene/isoprene copolymer.

2. The process according to claim 1, wherein the at least two aliphatic polyisocyanates comprise at least one linear aliphatic polyisocyanate and at least one branched aliphatic polyisocyanate in a weight ratio of 2:1 to 1.2:1.

3. The process according to claim 1, wherein the (modified) polyolefin, polyacrylic or rosin-based resin is selected from the group consisting of halogenated polyolefin resins, halogenated polyolefin maleic resins, chlorinated polypropylene maleic resins, polyolefin maleic resins, styrene/ethylene-butylene copolymer, styrene/butadiene copolymer, styrene/ethylene-propylene copolymer, styrene/isoprene copolymer, (meth)acrylate ester/(meth)acrylic acid copolymer, rosin-acid resins, and rosin-ester resins.

4. The process according to claim 1, wherein the process further comprises adding an organic solvent to the prepolymer obtained in step (1) to form a prepolymer/solvent mixture and dispersing the prepolymer/solvent mixture into a continuous aqueous phase and removing the co-solvent after step (3).

5. The process according to claim 4, wherein
   (1) the solvent is acetone; and/or
   (2) the solvent is used in an amount of up to 50 wt.-% relative to the total weight of the prepolymer.

6. The process according to claim 1, wherein the at least one polyol (a) comprises at least one partially hydrogenated polybutadiene polyol and at least one polyester polyol in a weight ratio of 10:1 to 1:10.

7. The process according to claim 1, wherein the (b) at least one modified polyether polyol is a halogenated polyether polyol having an average number molecular weight $M_n$ of 400 to 3000.

8. The process according to claim 1, wherein the at least one anionic stabilizer comprises a sulfonated polyglycol and/or 2,2-bis(hydroxymethyl)propionic acid (DMPA).

9. The process according to claim 1, wherein
(1) the polyisocyanates are used in a total amount resulting in a molar excess of isocyanato groups relative to the hydroxy groups of the combined polyols, the OH/NCO equivalent ratio being 1:1.1 to 1:4, and
(2) the polyisocyanates are selected from diisocyanates.

10. The process according to claim 1, wherein step (2) comprises emulsifying the polyurethane prepolymer into a continuous aqueous phase by mechanical stirring.

11. The process according to claim 1, wherein the chain extension agent comprises at least two NCO-reactive groups and is selected from the group consisting of water, a diol or a diamine, an alkylene diamine, a cycloalkylene diamine, a silane-containing diamine, an alkyldiol, or a polyetherdiamine.

12. The process according to claim 1, wherein the chain extension agent is selected from the group consisting of ethylene diamine, water, isophoronediamine, or a polyetherdiamine.

13. The process according to claim 1, wherein the chain extension agent is used in an amount that ensures essentially total conversion of the isocyanate groups.

14. An aqueous polyurethane dispersion obtained according to the process of claim 1.

15. An adhesive or coating composition comprising the aqueous polyurethane dispersion according to claim 14.

16. The process according to claim 1, wherein the polyisocyanate reactant consists of only aliphatic diisocyanates.

17. The process according to claim 1, wherein the polyisocyanate reactant consists of hexamethylene diisocyanate (HDI), isophorone diisocyanate (IPDI), methylene-4,4-bis(cyclohexyl)diisocyanate (H12MDI), triisocyanates based on hexamethylene diisocyanate (HDI) and mixtures thereof.

18. The process according to claim 1 wherein step (3) comprises reacting the prepolymer in the emulsion with at least one chain extension agent and an endcapping reagent.

* * * * *